Patented Feb. 17, 1953

2,628,934

UNITED STATES PATENT OFFICE 2,628,934

SEPARATION OF HYDROGEN HALIDES FROM OLEFINICALLY UNSATURATED COMPOUNDS

John H. Raley, Walnut Creek, William E. Vaughan, Berkeley, and Lee M. Porter, Richmond Annex, Calif., assignors to Shell Development Company, San Francisco, Calif., a corporation of Delaware No Drawing. Application January 14, 1950, Serial No. 138,707

7 Claims. (Cl. 202—57)

This invention relates to the separation of hydrogen halides from mixtures containing said halides together with one or more olefinically unsaturated organic compounds, and it is particularly concerned with a method for inhibiting reaction between the mixture components during their separation by fractionation.

Mixtures containing a hydrogen halide and one or more olefinically unsaturated organic compounds are commonly produced in large volume as by-products in a wide variety of industrial processes. Representative processes of this character are those involving halo-substitution of olefins or other unsaturated compounds, with the concomitant formation of hydrogen halide, as well as those wherein the hydrogen halide is itself reacted with the unsaturated organic compound. These mixtures are seldom discarded since the components thereof are valuable raw materials which are either recycled to the reactor or used in other chemical processes.

A number of methods for separating mixtures of this character are known to the art. In one the mixture is passed through water or an aqueous solution which selectively dissolves the hydrogen halide. However, while removal of the halide component of the mixture in this fashion is relatively simple, the same may not be said of the step whereby anhydrous hydrogen halide is recovered from the wash solution. The latter step is normally so expensive as to be economically unfeasible. In other separation methods the hydrogen halide is taken up by one or the other of a wide variety of chemicals in the form of a loose molecular adduct which is thereafter decomposed. This method, while expensive to operate due to large chemical and handling costs, is particularly effective when dealing with mixtures containing hydrogen fluoride, though it is not well adapted to the removal of the other hydrogen halides from such mixtures. The easiest method for separating the mixture components is by fractionation the hydrogen halide usually distilling off at the top of the still and the unsaturated component being collected as bottoms. The drawback of this method is that whenever the separation is effected in metallic fractionating columns especially those made up of a ferrous alloy, there ensues extensive hydrohalogenation of the unsaturated component of the mixture, it having been observed that this reaction is catalyzed by the salts which are formed in the column as the metal surfaces therein are attacked by acid. Even in the case of nickel-lined fractionating columns, considerable hydrohalogenation occurs once the liner has become so corroded as to give rise to the presence of appreciable amounts of nickel halide in the column.

It is therefore an object of this invention to provide an efficient and economical method for separating components of mixtures made up of hydrogen halide and one or more olefinically unsaturated compounds. A further object is to provide a method whereby mixtures of this character may be fractionated without material loss attributable to interaction of the type induced by a catalyst. A more particular object is to provide an efficient separation method of this character for use with mixtures made up of hydrogen chloride and a normally gaseous olefinic hydrocarbon. The nature of these ts well as other objects of the invention will become more fully apparent on a consideration of the descriptive portion to follow.

The present invention is based on the discovery that the losses normally encountered during fractionation of liquid mixtures made up of hydrogen halide and an olefinically unsaturated compound by reason of catalytically-induced interaction of the mixture components may be greatly reduced by dissolving in the mixture a small amount of at least one compound selected from the group consisting of amines, and the salts of amines with a hydrogen halide. Since these nitrogenous additives, if not initially added in the form of the salt, are normally converted thereto upon coming into contact with the liquid, hydrogen halide-containing mixture, it is important that the said additive be one whose hydrogen halide salt has at least a limited solubility (i. e., at least about 10 parts per million) in the liquid mixture being fractionated or otherwise treated. While the benefits of adding the nitrogenous compound are particularly manifest in fractionation operations, the invention may also usefully be employed in reducing the interaction which takes place in liquid, hydrogen halide-containing mixtures which are stored, transported, or otherwise maintained in contact with a material acting as a hydrohalogenation catalyst.

A wide variety of mixtures may be separated by fractionation into their respective components with reduced component-interaction according to the process of this invention. In addition to the hydrogen halide, whose concentration in the mixture may vary within wide limits, the mixture may contain any organic compound possessing one or more olefinic double bonds. Organic materials of this character which are commonly encountered in admixture with a hydrogen halide, and which may be separated therefrom in improved yield by a practice of the present invention, include alkyl, aralkyl and alicyclic compounds containing one or more olefinic linkages and embracing besides the unsaturated hydrocarbons, their various substitution and addition products which contain at least one olefinic double bond. Representative unsaturated compounds found in admixture with hydrogen halides are ethylene, propylene, 2-chloropropene, 1- and 2-butene, 1-chloro-2-butene, 3-methyl-1-butene, 2-methyl-2-butene, 3,3-dimethyl-1-butene, n-octene, 7-methyl-2-octene, 1-hexadecene, cyclohexene, 1,3-butadiene, isoprene, piperylene, 2-ethyl-1,3-butadiene, 1,5-hexadiene, 3-phenyl-1-propene and 1-phenyl-2-butene. These compounds may be present with the hydrogen halide either as individual compounds or as mixtures thereof. Further, the mixture may include other materials such as paraffins and the undesired hydrohalogenation product per se.

The nitrogenous compounds which are useful in suppressing reaction in the mixture may be selected from a wide variety of compounds. Thus, representative amines which are useful in suppressing reaction in the mixture are, for example, butylamine, isopropylamine, pentylamine, octylamine, decylamine, hexadecylamine, heptadecylamine, octadecylamine, heptadecenylamine, diisopropylamine, dioctylamine, dioctadecylamine, N-octyl-heptadecylamine, triethylamine, N-propyl-diethylamine, tri-n-butylamine, allylamine, N-allyl-diethylamine, undecylamine, benzylamine, urea, thiourea, guanidine, aniline, N-ethyl-benzylamine, phenethylamine, o-toluidine, p-toluidine, 3,5-xylidine, cumidine, alpha-naphthylamine p-phenylenediamine p-diaminobiphenyl, N-cetyl-aniline, N-phenyl-beta-naphthylamine, triaminobenzene, diphenylamine, N,N-dimethylaniline, N-methyl-N-isoamylaniline, N-ethyl-N-octylaniline, ethyl-N-hexylaniline, triphenylamine, cyclohexylamine, dicyclohexylamine, cyclopentylamine, 1,2-propanediamine, 1,4-naphthalenediamine, 4-methylcyclohexylamine, 4,4-diaminodiphenylethane, and di-(p-amyl-phenyl)amine, as well as those heterocyclic amines having carbon and nitrogen atoms in the ring, representative compounds of this variety being hexamethylenetetramine, melamine, phenyl melamine, pyridine, 2-(2-methyldodecyl)-pyridine, 8-hydroxyquinoline, phenylindole, mercaptobenzothiazole and mercaptobenzimidazole. As appropriate salt additives which are effective to reduce interaction in the described mixtures there may be mentioned, for example, the hydrogen chloride salts of any of the above enumerated amines. Good results are also obtained when the nitrogenous additive is one which contains other substituents than the amino (-NH$_2$) group, as, for example, 4-chloro-aniline, anthranilic acid, p-aminophenol, N-chlorourea, beta-amino-propionic acid, triethanolamine and 6-chlorohexylamine. All of these and other nitrogenous additives are effective for the purpose of this invention when present in solution, either singly or in combination with one another, in any given liquid mixture under treatment.

As has been noted above, catalytically-induced hydrohalogenation occurring in liquid mixtures containing hydrogen halide and an olefinically unsaturated compound may be greatly reduced by dissolving therein an amount of an amine, or a salt thereof, which, if desired, may be extremely small. Thus, it suffices to maintain a minimal concentration of the nitrogenous additive in the liquid undergoing fractionation of only about 10 parts per million, in terms of the corresponding hydrogen halide salt. On the other hand, it is preferred that the concentration of the nitrogenous additive in the liquid (again in terms of the hydrogen halide salt) be from about 25 to 1000 parts per million. While larger amounts than this may be used, the inhibitory effect of such larger amounts is not materially greater than is that obtained when the concentration falls within this preferred range.

The nitrogenous additive may be supplied to the liquid mixture under treatment in any desired manner. In the case of batch operation, the requisite amount of the additive may be supplied in a single addition, following which the liquid can be distilled in the usual fashion. On the other hand, when the liquid mixture is subjected to continuous distillation in a fractionating column, it is necessary that the material be added in a continuous or semi-continuous manner and in such a fashion as to distribute the same throughout all portions of the liquid in the column which are undergoing fractionation. Such distribution is usually accomplished by adding the nitrogenous compound near the top of the fractionating column, or at least well above the point of entry therein of the incoming feed stream.

While addition of one or more nitrogenous compounds of the type described above proves effective in reducing catalytically-induced interaction between a hydrogen halide and any one or more of a variety of olefinically unsaturated compounds, the invention finds its widest employment in connection with mixtures made up essentially of hydrogen chloride and an olefinic hydrocarbon, of which propylene is a good example. Accordingly, the invention will be more particularly described hereinafter as it relates to the fractionation of hydrogen chloride-propylene mixtures.

Heavy losses due to formation of isopropyl chloride have heretofore been encountered in fractionating hydrogen chloride-propylene mixtures, though some methods have proved to be more efficient than others. Thus, when the operation is effected in a stainless steel fractionating column, losses attributable to isopropyl chloride formation as high as 75% of the theoretical maximum are commonly encountered. When nickel fractionating equipment is used this loss may be reduced to about 10 to 15% of theoretical provided the feed stream be provided with from about 20 to 200 p. p. m. of water. However, this is still an undesirably high conversion factor, and, furthermore, the presence of water in the feed is disadvantageous since it greatly accelerate corrosion of the metal surfaces in the column. It has now been found that the amount of isopropyl chloride formed in the fractionating column may be reduced still further, i. e., to but about 3–5% of theoretical, by dissolving a nitrogenous additive of the type described above in the liquid mixture undergoing fractionation. As noted above, the concentration of such additive which is maintained in the liquid may be as small as 10 p. p. m., though it is preferably from about 25 to 1000 p. p. m. and may be even more. By the practice of this method the loss of mixture components to isopropyl chloride is reduced to substantially that encountered when the fractionation is conducted in glass apparatus, and the same may be said of any other hydrogen halide-olefinically unsaturated compound-containing mixture under study.

The following examples are illustrative of the present invention in various of its embodiments:

*Example I*

A gaseous stream consisting essentially of 28% hydrogen chloride, 71% proplyene and the balance isoproply chloride is continuously fed at the rate of 10,875 lbs./hr. and at a temperature of approximately 40° C., to a mid-portion of a 40 plate nickel-lined fractionating column operated at a pressure of 225 p. s. i. g., a head temperature of −18° C., and a reboiler temperature of 41° C. Essentially pure hydrogen chloride is withdrawn as the overhead product from this column, the same being refrigerated and returned to the top of the column as reflux in the ratio of approximately 7 parts for each part withdrawn as product. The propylene and any isopropyl chloride formed during the operation or present in the feed stream are taken off as bottoms. Under these conditions isopropyl chloride is formed at the rate of from 40 to 50 tons per day, representing a conversion of from about 51 to 64% of theoretical. The foregoing operation is then repeated, but with the addition of approximately 100 p. p. m. of water in the feed stream. This water-injection treatment has the desirable result of decreasing the amount of isopropyl chloride formed to about 10 tons per day, though at the same time it gives rise to considerable corrosion of the internal surfaces of the column. In a series of other operations, water injection is stopped and N,N-dimethylaniline is continuously pumped into the column at the 38th tray at rates sufficient to provide N,N-dimethylaniline hydrochloride concentrations varying from about 25 to 200 p. p. m. in the liquid portions present on the 38th and those lower trays which contained substantial amounts of HCl. In the case of all operations conducted in the presence of the added N,N-dimethylaniline, the amount of isopropyl chloride produced ranges from approximately 3 to 4 tons per day, which represents conversion to isopropyl chloride of but about 4 to 5% of theoretical, and furthermore, there is no appreciable corrosion of the column surfaces. In other operations wherein the water and N,N-dimethylaniline treatments here described are combined, it has not been possible to make any further reduction in the amount of isopropyl chloride produced.

*Example II*

In this operation a hydrogen chloride-propylene mixture containing approximately 30% hydrogen chloride is fractionated under substantially the same conditions as described in the foregoing example, except that here the fractionating column is fabricated of stainless steel instead of nickel. When neither water nor a nitrogenous additive of the type described above is injected into the column, the losses of mixture components due to formation of isopropyl chloride exceed 75% of theoretical. While this loss is reduced to approximately 20% by injecting 100 parts per million of water into the feed stream, water-injection so accelerates corrosion of the steel surfaces in the column as to make the process impractical of inoperation. In a series of other operations conducted with an anhydrous feed, the column is successively supplied with 3,5-xylidene, n-decylamine, pyridine, n-hexadecylamine, dicyclohexylamine hydrochloride and tri-n-butylamine, each in an amount sufficient to maintain a concentration of approximately 100 parts per million thereof (in terms of the corresponding hydrogen chloride salt) in the liquid undergoing fractionation. It is found that with each of these additives, employment thereof has the effect of reducing isopropyl chloride formation to but about 5% of theoretical.

*Example III*

In this operation a liquid mixture containing equi-molar amounts of hydrogen chloride and propylene is fed at 0° C., under a pressure of 400 p. s. i. g. through a glass-lined reaction chamber having a volume of 83 cc. at such a rate as to provide a residence time of nine minutes in said chamber. This chamber contained 14 grams of a hydrochlorination catalyst prepared by slurrying a mixture of 30 grams of powdered silica and 10 grams of a water paste of powdered nickel hydrogenation catalyst with 125 mm. of 3N HCl, drying the resulting slurry in air, and then calcining the pre-dried material by heating at 200° C. for from 4 to 6 hours under vacuum. Under these conditions it is found that the conversion to isopropyl chloride is approximately 79% of theoretical. By adding 75 parts per million of N,N-dimethylaniline to the feed stream, the conversion to isopropyl chloride is reduced to 14%. In a succeeding operation, 59 parts per million of a product made up of approximately 15% octadecenylamine, 15% octadecadienylamine and 70% abietylamine is substituted in the feed stream for the N,N-dimethylaniline. In this case the conversion to isopropyl chloride is 25% of theoretical.

*Example IV*

A liquid mixture made up of equi-molar amounts of hydrogen chloride and propylene is placed in a closed, glass lined reaction chamber under a pressure of 200 p. s. i. and at a temperature of 0° C. along with 1900 p. p. m. of finely powdered nickel chloride, which acts as a hydrochlorination catalyst. Under these conditions the hydrogen chloride and propylene react to form isopropyl chloride at a rate equivalent to approximately 2.84% of the theoretical maximum total conversion, per minute. This process is then repeated in the presence of one or another of various nitrogenous inhibitors. In the first such operation the addition of 600 p. p. m. of n-decylamine reduces the rate of isopropyl chloride formation to 0.02% (of the maximum total conversion) per minute. Similarly, with 700 p. p. m. of 3,5-xylidene, 300 p. p. m. of N,N-dimethylaniline, 700 p. p. m. of dicyclohexylamine hydrochloride and 700 p. p. m. of hexamethylenetetramine, the rate of isopropyl chloride formation is reduced to 0.05%, 0.09%, 0.51% and 0.55% per minute, respectively. It should be noted that in the operations involving 3,5-xylidene, N,N-dimethylaniline, and dicyclohexylamine hydrochloride, the amounts of catalyst employed were 2000, 2200 and 2100 p. p. m., respectively.

As may be seen from the foregoing examples the benefits of the present invention are achieved no matter what metal be used in the fabrication of the fractionating column or other container for the liquid mixture. Further, with the addition of a suitable amine, or salt thereof, it no longer becomes necessary to inject water into the feed stream in order to reduce the isopropyl chloride production rate. In fact, the process of the present invention is preferably conducted in the total absence of water or with at least no more than about 10 parts per million of water in the feed stream, that the problem of corrosion may be reduced to a minimum.

As stressed in the foregoing descriptive portions of the invention, the process thereof is applied with particular advantage to the separation of hydrogen chloride from propylene or other olefinic hydrocarbons. It is to be understood, however, that the invention is in no wise limited in its application to the treatment of such mixtures but may also be applied to the separation of any hydrogen halide from any organic compound containing one or more olefinic linkages in its molecular structure.

The percentages given herein are on a weight basis.

The invention claimed is:

1. In a method for separating the hydrogen halide and the olefinically unsaturated hydrocarbon components of a liquid mixture by fractionation, the improvement comprising effecting said fractionation in the presence of at least one compound selected from the group consisting of amines and their hydrogen halide salts, which compound is dissolved in the said liquid mixture.

2. In a method for separating the hydrogen halide and the olefinically unsaturated hydrocarbon components of a liquid mixture by fractionation, the improvement comprising effecting said fractionation in the presence of an amine which is dissolved in said liquid mixture.

3. The method of claim 2 wherein the amine is N,N-dimethylaniline.

4. In a method for separating the hydrogen halide and the olefinically unsaturated hydrocarbon components of a mixture wherein said mixture is continuously fed to a fractionating column operated under such conditions as to maintain the mixture in the liquid state, with the hydrogen halide being distilled off at the top of the column and the olefinic component being withdrawn therefrom as bottoms, the improvement comprising effecting said fractionation while adding to the liquid undergoing fractionation a compound selected from the group consisting of amines and their hydrogen halide salts, said compound being added in an amount sufficient to maintain a concentration of at least 10 p. p. m. thereof in solution in said liquid.

5. In a method of separating the hydrogen chloride and olefinic hydrocarbon components of a mixture wherein said mixture is continuously fed to a fractionating column operated under such conditions as to maintain the mixture in the liquid state, with the hydrogen chloride being distilled off at the top of the column and the olefinic hydrocarbon being withdrawn as bottoms therefrom, the improvement comprising effecting said fractionation while adding to the liquid undergoing fractionation a compound selected from the group consisting of amines and their hydrogen halide salts, said compound being added in an amount sufficient to maintain a concentration of from 25 to 1000 p. p. m. thereof in solution in said liquid.

6. The method of claim 5 wherein the olefinic hydrocarbon is propylene and the compound added to the liquid undergoing fractionation is an amine.

7. The method of claim 5 wherein the olefinic hydrocarbon is propylene and the compound added to the liquid undergoing fractionation is N,N-dimethylaniline.

JOHN H. RALEY.
WILLIAM E. VAUGHAN.
LEE M. PORTER.

REFERENCES CITED

The following references are of record in the file of this patent:

UNITED STATES PATENTS

| Number | Name | Date |
|---|---|---|
| 2,058,465 | Kharasch | Oct. 27, 1936 |
| 2,143,478 | Engs et al. | Jan. 10, 1939 |
| 2,227,953 | Baehr et al. | Jan. 7, 1943 |
| 2,321,472 | Engs et al. | June 8, 1943 |
| 2,374,476 | Evans et al. | Apr. 24, 1945 |
| 2,375,036 | Pierotti et al. | May 1, 1945 |
| 2,398,468 | Schulze et al. | Apr. 16, 1946 |
| 2,510,847 | Wilson | June 6, 1950 |
| 2,543,575 | Harvey | Feb. 27, 1951 |